United States Patent
Weise

(10) Patent No.: US 7,184,950 B2
(45) Date of Patent: *Feb. 27, 2007

(54) METHOD AND APPARATUS FOR IMPROVED GRAMMAR CHECKING USING A STOCHASTIC PARSER

(75) Inventor: David Neal Weise, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/177,129

(22) Filed: Jul. 8, 2005

(65) Prior Publication Data

US 2005/0246158 A1 Nov. 3, 2005

Related U.S. Application Data

(62) Division of application No. 09/904,232, filed on Jul. 12, 2001, now Pat. No. 7,003,444.

(51) Int. Cl.
*G06F 17/27* (2006.01)
(52) U.S. Cl. .................. 704/9; 704/1; 704/2; 704/5
(58) Field of Classification Search .............. 704/1–10
See application file for complete search history.

(56) References Cited

U.S. PATENT DOCUMENTS

| | | | | |
|---|---|---|---|---|
| 5,799,269 | A | * | 8/1998 | Schabes et al. ................. 704/9 |
| 5,963,894 | A | * | 10/1999 | Richardson et al. ........... 704/9 |
| 5,999,896 | A | * | 12/1999 | Richardson et al. ........... 704/9 |
| 6,076,051 | A | | 6/2000 | Messerly et al. .............. 704/9 |
| 6,424,983 | B1 | * | 7/2002 | Schabes et al. ............. 715/533 |
| 6,631,346 | B1 | * | 10/2003 | Karaorman et al. ........... 704/9 |
| 7,003,444 | B2 | * | 2/2006 | Weise ............................ 704/9 |
| 7,027,974 | B1 | * | 4/2006 | Busch et al. ................... 704/4 |
| 2002/0042711 | A1 | * | 4/2002 | Lin ............................. 704/257 |

OTHER PUBLICATIONS

Sharon A. Caraballo and Eugene Charniak, "New Figures of Merit for Best-First Probabilistic Chart Parsing", Association for Computational Linguistics, 1998, vol. 24, No. 2, pp. 275-298.

(Continued)

*Primary Examiner*—Richemond Dorvil
*Assistant Examiner*—Qi Han
(74) *Attorney, Agent, or Firm*—John D. Veldhuis-Kroeze; Westman, Champlin & Kelly, P.A.

(57) ABSTRACT

A method and grammar checking system are provided that generate a stochastic score, or a statistical goodness measure, for each of an input string of text and one or more alternative strings of text. An alternative generator generates the alternative strings of text, and a ranking parser produces parse trees and corresponding statistical goodness measures for each of the strings. The string of text having the highest goodness measure is selected for recommendation to a user.

16 Claims, 13 Drawing Sheets

OTHER PUBLICATIONS

R.T. Martins, et al., "Linguistic issues in the development of ReGra: a grammar checker for Brazilian Portuguese", Natural Language Engineering, vol. 4, pt. 4, pp. 287-307, Dec. 1998.

P. Jager and J. Hric, "A Grammar Checker Prototype for Free Word-Order Languages", Practical Application of PROLOG. The Proceedings of the Third International Conference on the Practical Application of Prolog, pp. 353-354, 1995.

T. Brehony and K. Ryan, "Francophone Stylistic Grammar Checking (FSGC) Using Link Grammars", Computer Assisted Language Learning, vol. 7, No. 3, pp. 257-269, 1994.

Liou Hsien-Chin, "Development of an English Grammar Checker A Progress Report", CALICO Journal, vol. 9, No. 1, pp. 57-70, Autumn 1991.

* cited by examiner

Parse Tree 590
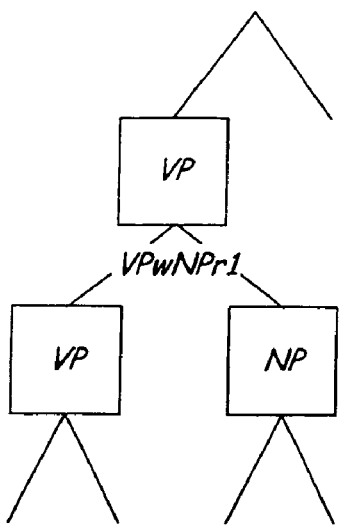
Parse Tree 592
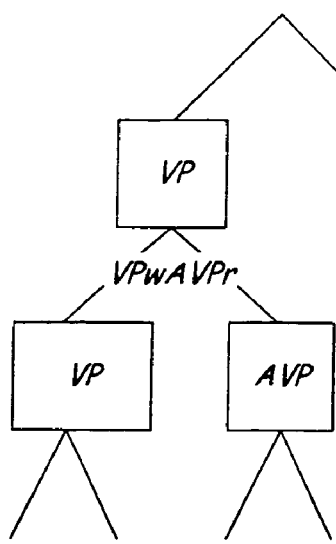
FIG. 9a
Parse Tree 594
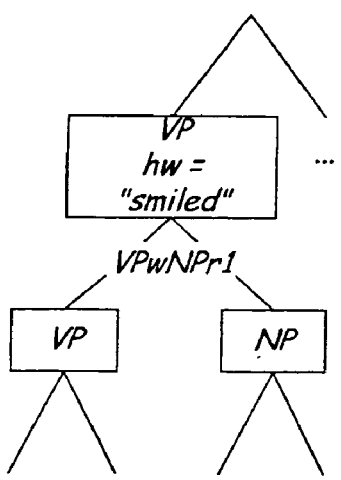
Parse Tree 596
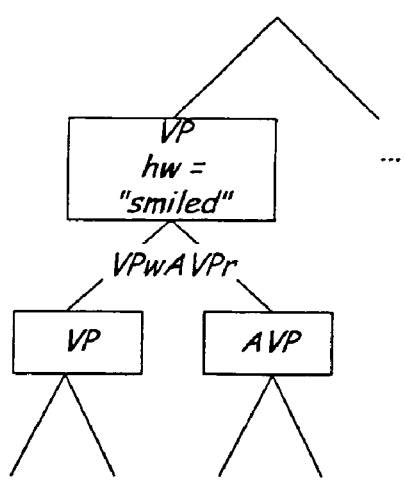
FIG. 9b

| Rule Name | Rule | | | Description (and an example) |
|---|---|---|---|---|
| VERBtoVP | VP | → | VERB | Promote a verb into a verb phrase |
| PredAdj | VP | → | VP  AJP | Add on an adjective. "It has been *found effective*" |
| VPwNPr1 | VP | → | VP  NP | Add direct object to a VP "I *hit Bill*" |
| Perfect | VP | → | VP  VP | Adds the VP "have" to a VP "Joe *had gone*" |
| SubjPQuant | VP | → | NP  VP | Add quantifiers to the VP like "all", "both", ... "The children have *all gone*" |
| VPwNP1 | VP | → | NP  VP | Add noun subject to a VP "*John jumped.*" |
| SubjectAJP | VP | → | AJP  VP | Add AJP subject to a VP "*More surprising is his attitude*" |
| InvertAJPwS | VP | → | AJP  VP | Add final modifier, AJP, to the left of a VP "*More remarkable still, he went*" |
| Topicalization | VP | → | NP  VP | Add object of VP, NP, to the left of a VP "*A better-looking man I have not seen*" |

| Phrase Level | Rule Name | Rule | | | Level Description |
|---|---|---|---|---|---|
| 1 | VERBtoVP | VP(1) → | VERB(PL_Verb_Max) | | Create a VP |
| 2 | PredAdj | VP(2) → | VP(1) | AJP(PL_AJP_Max) | Add post modifiers |
| | VPwNPr1 | VP(2) → | VP(1) | NP(PL_AJP_Max) | |
| | VPNull2 | VP(2) → | VP(1) | | |
| 3 | Perfect | VP(3) → | VP(1) | VP(2,3) | Add "have" and quantifiers |
| | SubjPQuant | VP(3) → | NP(PL_NP_Max) | VP(2,3) | |
| | VPNull3 | VP(3) → | VP(2) | | |
| 4 | VPwNP1 | VP(4) → | NP(PL_NP_Max) | VP(3) | Add subject |
| | SubjectAJP | VP(4) → | AJP(PL_AJP_Max) | VP(3) | |
| | VPNull4 | VP(4) → | VP(3) | | |
| 5 | InvertAJPwS | VP(5) → | AJP(PL_AJP_Max) | VP(4) | Add modifiers to VPs that have a subject |
| | Topicalization | VP(5) → | NP(PL_NP_Max) | VP(4) | |
| | VPNull5 | VP(5) → | VP(4) | | |

METHOD AND APPARATUS FOR IMPROVED GRAMMAR CHECKING USING A STOCHASTIC PARSER

The present application is a divisional of and claims priority of U.S. patent application Ser. No. 09/904,232, filed Jul. 12, 2001 now U.S. Pat. No. 7,003,444, the content of which is hereby incorporated by reference in its entirety.

CROSS-REFERENCE TO RELATED APPLICATION

Cross reference is made to U.S. patent application Ser. No. 09/620,745, entitled, "RANKING PARSER FOR A NATURAL LANGUAGE PROCESSING SYSTEM", filed Jul. 20, 2000.

BACKGROUND OF THE INVENTION

The present invention relates to natural language processing. In particular, the present invention relates to grammar checker processing of natural language text.

A computer program that checks a user's grammar for correctness is called a grammar checker. Upon finding a mistake, a grammar checker usually flags the error to the user and suggests a correction. Users find grammar checkers to be very helpful. However the usefulness is dependent on the quality of the corrections the grammar checker suggests. The higher the accuracy, the happier the user.

In various grammar checkers, there are some mistakes that are difficult to evaluate using just heuristics. One such mistake is agreement between subject and verb. For example, the subject and verb in "He very quickly, after turning out the lights, eat the pistachios" do not agree. In this example, the subject and the verb are separated by a long distance, and so larger structures need to be considered. In the example "I insist that he go", if one just looks at 'he go' it would seem that there is disagreement. However, because it is an argument clause to 'insist' there is no disagreement. In this case again one needs to consider larger scale structures. In many cases the correct larger scale structures to use are parts of the complete parse tree for the sentence.

There are other types of hard mistakes, such as writing 'their' where 'there' is meant. Again, for this type of mistake the best way to know if a mistake has been made is often to look at the parse tree for the entire sentence. Another hard type of mistake is either not forming possessives correctly, or using a possessive where a plural was meant.

There are various heuristics grammar checkers can use to identify such mistakes. Most of these involve some form of template matching. For example one might construct a template that says if 'their' is followed by 'is', then change it to 'there'. Some grammar checkers have used probabilistic techniques using as evidence the words within a certain distance of the search site. Some use Hidden Markov Model techniques to identify errors. Some techniques use a parser to help identify mistakes. In all of these methods there are two distinct processes going on. The first process is the search for constructions that might be in error. The second process is the evaluation of the choices to see if an error was actually made. Both of these processes are error prone.

Although these techniques for grammar checking natural language text have proven useful, there is an ongoing need to further improve the quality of the corrections suggested by the grammar checker. In particular, there is an ongoing need to improve the evaluation processes of grammar checkers.

Overview of Natural Language Processing

An overview of natural language processing (NLP) and related concepts is provided to aid in the understanding of the concepts of the invention. A NLP system is typically a computer-implemented software system, which intelligently derives meaning and context from an input string of natural language text. "Natural languages" are the imprecise languages that are spoken by humans (e.g., English, French, Japanese). Without specialized assistance, computers cannot distinguish linguistic characteristics of natural language text. A NLP system assists the computer in distinguishing how words are used in different contexts and in applying rules to construct intelligible language.

NLP Parser

The core of a NLP system is its parser. Generally, a parser breaks an utterance (such as a phrase or sentence) down into its component parts with an explanation of the form, function, and syntactical relationship of each part. The NLP parser takes a phrase and builds for the computer a representation of the syntax of the phrase that the computer can understand. A parser may produce multiple different representations for a given phrase. The representation makes explicit the role each word plays and the relationships between the words. As used herein, an utterance is equivalent to a phrase. A phase is a sequence of words intended to have meaning. In addition, a sentence is understood to be one or more phrases. In addition, references herein to a human speaker include a writer and speech includes writing.

FIG. 1 shows a NLP parser 20 of a typical NLP system. The parser 20 has four key components: tokenizer 28; grammar rules interpreter 26; searcher 30; and parse ranker 34. The parser 20 receives a textual string 22. Typically, this is a sentence or a phrase. The parser also receives grammar rules 24. These rules attempt to codify and interpret the actual grammar rules of a particular natural language, such as English. Alternatively, these rules may be stored in memory within the parser.

The grammar rules interpreter 26 interprets the codified grammar rules. The tokenizer 28 identifies the words in the textual string 22, looks them up in a dictionary, makes records for the parts of speech (POS) of a word, and passes these to the searcher. The searcher 30 in cooperation with the grammar rules interpreter generates multiple grammatically correct parses of the textual string. The searcher sends its results to the parse ranker 34.

The parse ranker 34 mathematically measures the "goodness" of each parse and ranks them. "Goodness" is a measure of the likelihood that such a parse represents the intended meaning of the human speaker (or writer). The ranked output of the parser ranker is the output of the ranker. This output is one or more of parses 38 ranked from most to least goodness.

Linguistic Concepts of NLP

Linguists group words of a language into classes, which show similar syntactic behavior, and often a typical semantic type. These word classes are otherwise called "syntactic" or "grammatical categories", but more commonly still by the traditional names "part of speech" (POS). For example, common POS categories for English include noun, verb, adjective, preposition, and adverb.

Generally, words are organized into phrases, which are groupings of words that are clumped as a unit. Syntax is the study of the regularities and constraints of word order and phrase structure. Among the major phrase types are noun phrases, verb phrases, prepositional phrases, and adjective phrases.

The headword is the key word in a phrase. This is because it determines the syntactic character of a phrase. In a noun phrase, the headword is the noun. In a verb phrase, it is the main verb. For example, in the noun phrase "red book", the headword is "book." Similarly, for the verb phrase "going to the big store", the headword is "going." A modifying headword is the headword of a sub-phrase within a phrase where the sub-phrase modifies the main headword of the main phrase. Assume a phrase (P) has a headword (hwP) and a modifying sub-phrase (M) within the P that modifies hwP. The modifying headword (hwM) is the headword of this modify phrase (M).

Syntactic features are distinctive properties of a word relating to how the word is used syntactically. For example, the syntactic features of a noun include whether it is singular (e.g. cat) or plural (e.g. cats) and whether it is countable (e.g. five forks) or uncountable (e.g. air). The syntactic feature of a verb includes whether or not it takes an object, for example.

Computational Linguistics

In computational linguistics, the regularities of a natural language's word order and grammar are often captured by a set of rules called "transitions" or "rewrite rules." The rewrite rules are a computer representation of rules of grammar. These transitions are used to parse a phrase. A rewrite rule has the notation form: "symbolA→symbolB symbolC . . . ". This indicates that symbol (symbolA) on the left side of the rule may be rewritten as one or more symbols (symbolB, symbolC, etc.) on the right side of the rule.

For example, symbolA may be "s" to indicate the "start" of the sentence analysis. SymbolB may be "np" for noun phrase and symbolC may be "vp" for verb phrase. The "np" and "vp" symbols may be further broken down until the actual words in the sentence are represented by symbolB, symbolC, etc. For convenience, transitions can be named so that the entire rule need not be recited each time a particular transition is referenced.

The nature of the rewrite rules is that a certain syntactic category (e.g., noun, np, vp, pp) can be rewritten as one or more other syntactic categories or words. The possibilities for rewriting depend solely on the category, and not on any surrounding context, so such phrase structure grammars are commonly referred to as context-free grammars (CFG).

FIG. 2 illustrates a CFG parse tree 50 of a phrase (or sentence). This tree-like representation of the sentence "flies like ants" is deconstructed using a CFG set of rewrite rules (i.e, transitions). The tree 50 has leaf nodes (such as 52a–52c and 54a–54g.)

The tree 50 includes a set of terminal nodes 52a–52c. These nodes are at the end of each branch of the tree and cannot be further expanded. For example, "like" 52b cannot be expanded any further because it is the word itself. The tree 50 also includes a set of non-terminal nodes 54a–54g. These nodes are internal and may be further expanded. Each non-terminal node has immediate children, which form a branch (i.e., "local tree"). Each branch corresponds to the application of a transition. For example, "np" 54b can be further expanded into a "noun" by application of the "np_noun" transition.

Each non-terminal node in the parse tree is created via the application of some rewrite rule. For example, in FIG. 2, the root node 54a was created by the "s→np vp" rule. The "VP" node 54d by the "s→verb np" rule. The tree 50 has a non-terminal node 54a designated as the starting node and it is labeled "s." In general, the order of the children in each branch generates the word order of the sentence, and the tree has a single root node (in FIG. 2 it is node 54a), which is the start of the parse tree.

A non-terminal node has a type that is called its "segtype." In FIG. 2, each non-terminal node 54a–g is labeled with its segtype. A node's segtype identifies the rule that was used to create the node (working up from the terminal nodes). For example, the segtype of node 54b in FIG. 2 is "np" because the rule "np→noun" was used to create the node.

In given grammar, a segtype can be many different values including, for example: NOUN, NP (noun phrase), VERB, VP (verb phrase), ADJ (adjective), ADJP (adjective phrase), ADV (adverb), PREP (preposition), PP (prepositional phrase), INFCL (infinitive clauses), PRPRT (present participial clause) PTPRT (past participial clause), RELCL (relative clauses), and AVPVP (a verb phrase that has a verb phrase as its head).

In this document, a functional notation is used to refer to the information associated with a node. For example, if a variable "n" represents a node in the tree, then "hw(n)" is the headword of node "n." The following functions are used through out this document:

hw(n) is the headword of node n
segtype(n) is the segtype of node n
trans(n) is the transition (rewrite rule) associated with node n
trn(n) is the name of the transition
modhw(n) is the modifying headword of node n A parse tree can be annotated with information computed during the parsing process. A common form of this is the lexicalized parse tree where each node is annotated with its headword. One can annotate a parse tree with additional linguistic information (e.g. syntactic features). FIG. 3 shows an example of such a lexicalized parse tree 60. FIG. 3 is a parse tree of one or many parses of the sentence, "swat flies like ants." Terminal nodes 62a–d, which are the words of the sentence, are not annotated. Non-terminal nodes 64a–i are annotated. For example, node 64h has a segtype of "noun" and is annotated with "hw=ants". This means that its headword is "ants." The parse tree 60 in FIG. 3 is also annotated with the names of the transitions between nodes. For example, the transition name "vp_verbvp" is listed between node 64f and node 64h.

A probabilistic context free grammar (PCFG) is a context free grammar where every transition is assigned a probability from zero to one. PCFGs have commonly been used to define a parser's "goodness" function. "Goodness" is a calculated measurement of the likelihood that a parse represents the intended meaning of the human speaker. In a PCFG, trees containing transitions that are more probable are preferred over trees that contain less probable transitions.

Since the probability of a transition occurring cannot be mathematically derived, the standard approach is to estimate the probabilities based upon a training corpus. A training corpus is a body of sentences and phrases that are intended to represent "typical" human speech in a natural language. The speech may be intended to be "typical" for general applications, specific applications, and/or customized applications. This "training corpus" may also be called "training data."

An augmented phrase structured grammar (APSG) is a CFG that gives multiple names to each rule, thereby limiting the application of each "named" rule. Thus, for each given rewrite rule there are more than one name and the name limits its use to specific and narrower situations. For example, the structure "VP→NP VP" may have these limiting labels: "SubjPQuant" and "VPwNPl." SubjPQuant specifies subject post-quantifiers on a verb phrase. For example, in "all found useful . . . ", "all" is a subject post-quantifier, In "we all found useful the guidelines" is [NP all][VP found useful the guidelines]. VPwNPl specifies a subject to a verb phrase. For example, in "John hit the ball" [NP John] [VP hit the ball] where John is the subject.

Given the ambiguity that exists in natural languages, many sentences have multiple syntactic interpretations. The different syntactic interpretations generally have different semantic interpretations. In other words, a sentence has more than one grammatically valid structure ("syntactic interpretation") and as a result, may have more than one reasonable meaning ("semantic interpretation") A classic example of this is the sentence, "time flies like an arrow." There are seven valid syntactic parse trees.

FIGS. 4a and 4b show examples of two of the seven valid parses of this sentence. For the parse tree 70 of FIG. 4a, the object "time" 74 moves in a way that is similar to an arrow. For the parse tree 80 of FIG. 4b, the insects called "time flies" 84 enjoy the arrow object; just as one would say "Fruit flies like a meal." Either parse could be what the speaker intended. In addition, five other syntactically valid parses may represent the meaning that the speaker intended.

A conventional approach used in NLP systems to determine which of multiple grammatically correct parses is the "correct" one is the use of a "goodness" function to calculate a "goodness measure" of each valid parse. Existing parsers differ in the extent to which they rely on a goodness function, but most parsers utilize one. A number of different goodness measures have been used in natural language systems to rank parse trees. For example goodness measures based upon probabilities determined by how frequently given parse tree occurred in a training corpus (a "straw man" approach) have been used. Other goodness measures use a collection of mostly unrelated statistical calculations based upon parts of speech, syntactic features, word probabilities, and selected heuristic rules. Still other goodness measures are based upon syntactic bigram approaches, transition probability approaches (TPA), or other methods.

SUMMARY OF THE INVENTION

A method and grammar checking system are provided that generate a stochastic score, or a statistical goodness measure, for each of an input string of text and one or more alternative strings of text. An alternative generator generates the alternative strings of text, and a ranking parser produces parse trees and corresponding statistical goodness measures for each of the strings. The string of text having the highest goodness measure is selected for recommendation to a user.

BRIEF DESCRIPTION OF THE DRAWINGS

FIGS. 9a and 9b show fragments of two pairs of typical parse trees, respectively without and with headword annotation.

FIG. 10 is a table illustrating examples of rules which create a given segtype and which are therefore grouped into levels in some embodiments of the invention.

FIG. 12 is a table illustrating rules associated with particular phrase levels in some embodiments of the invention.

DETAILED DESCRIPTION OF ILLUSTRATIVE EMBODIMENTS

Figure 1:
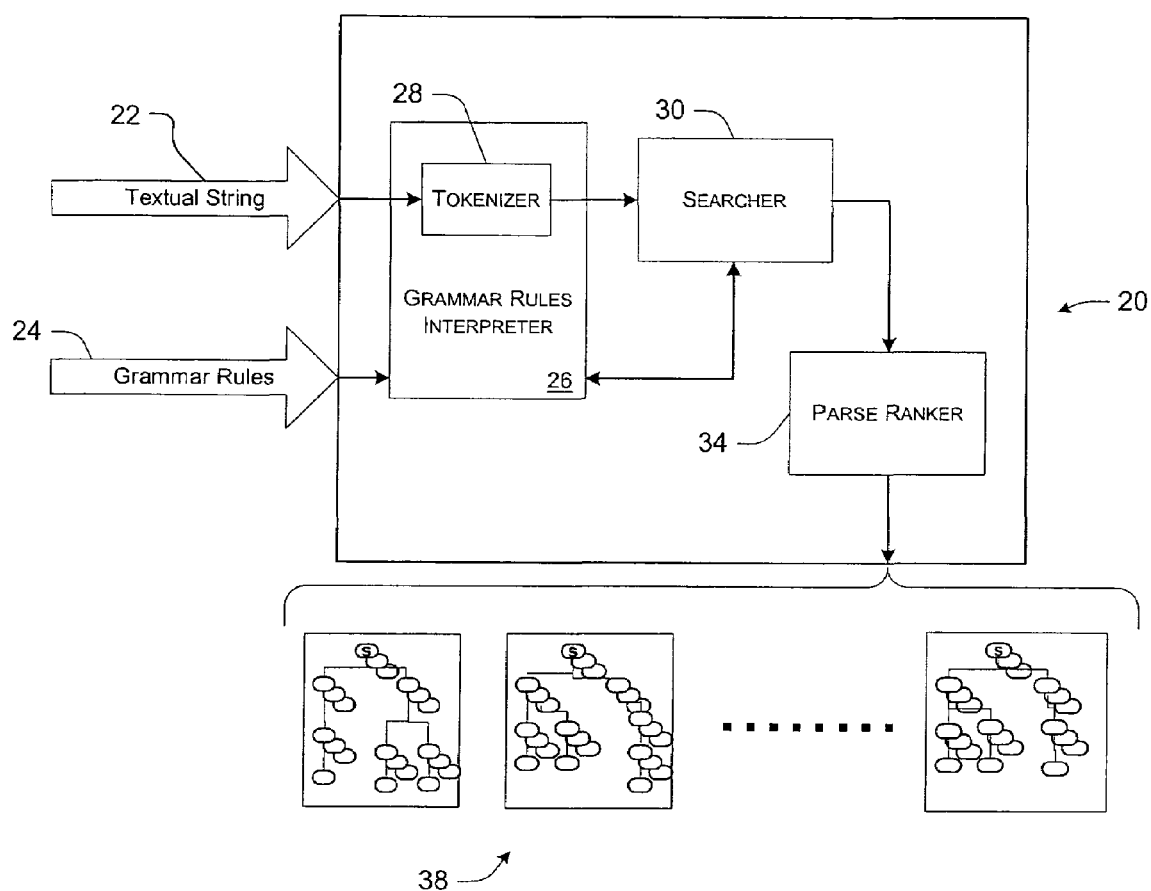
FIG. 1 is a schematic illustration of an exemplary natural language processing system.
Figure 2:
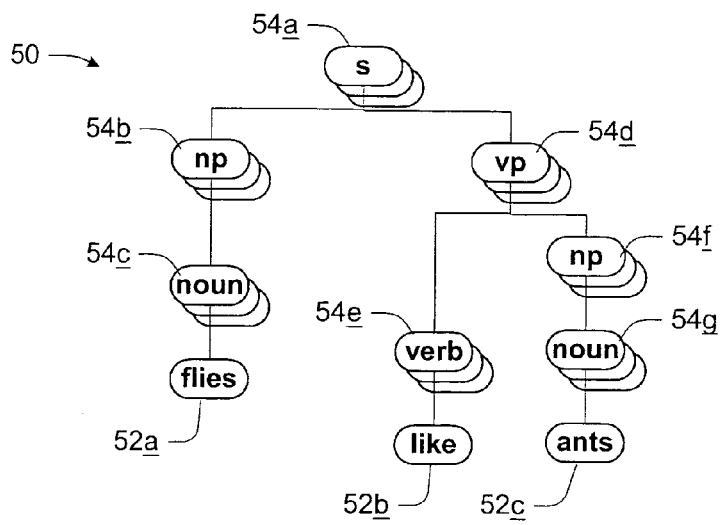
FIG. 2 is an illustration of a typical parse tree representing a syntactically valid parse of sample phrase, "flies like ants."
Figure 3:
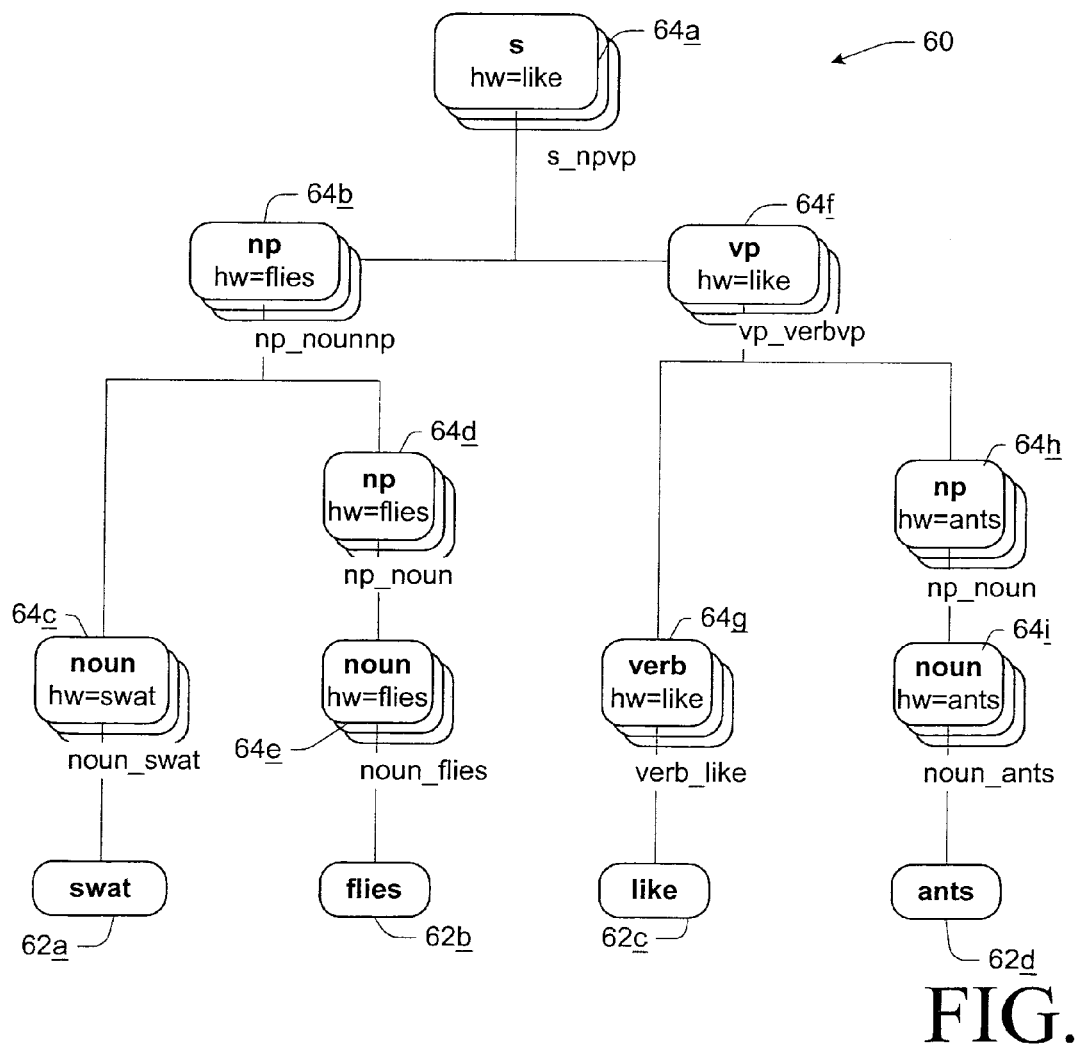
FIG. 3 is another illustration of a typical parse tree, representing a syntactically valid parse of sample phrase "swat flies like ants," which is annotated to indicate transitions and headwords.
Figure 4A:
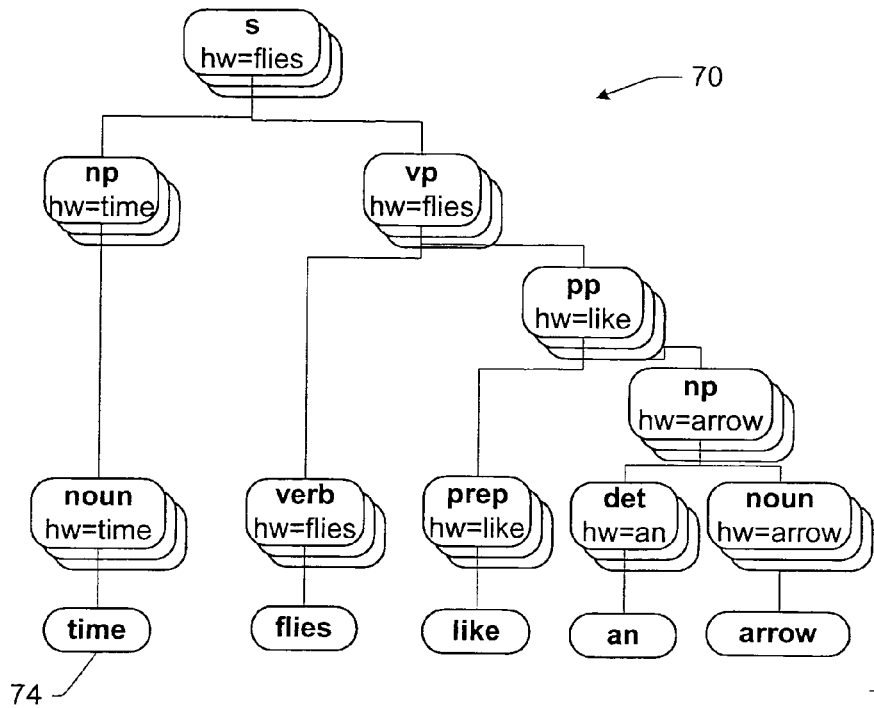
FIGS. 4a and 4b illustrate two exemplary parse trees of two of seven syntactically valid parses of sample phrase "time flies like an arrow."
Figure 4B:
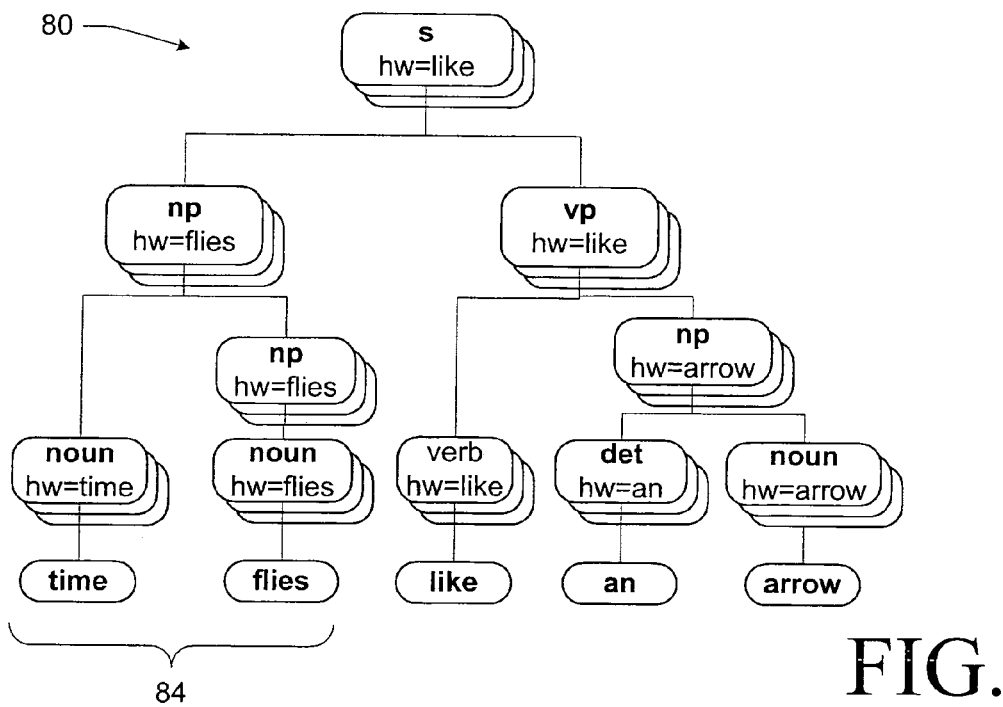
Figure 5:
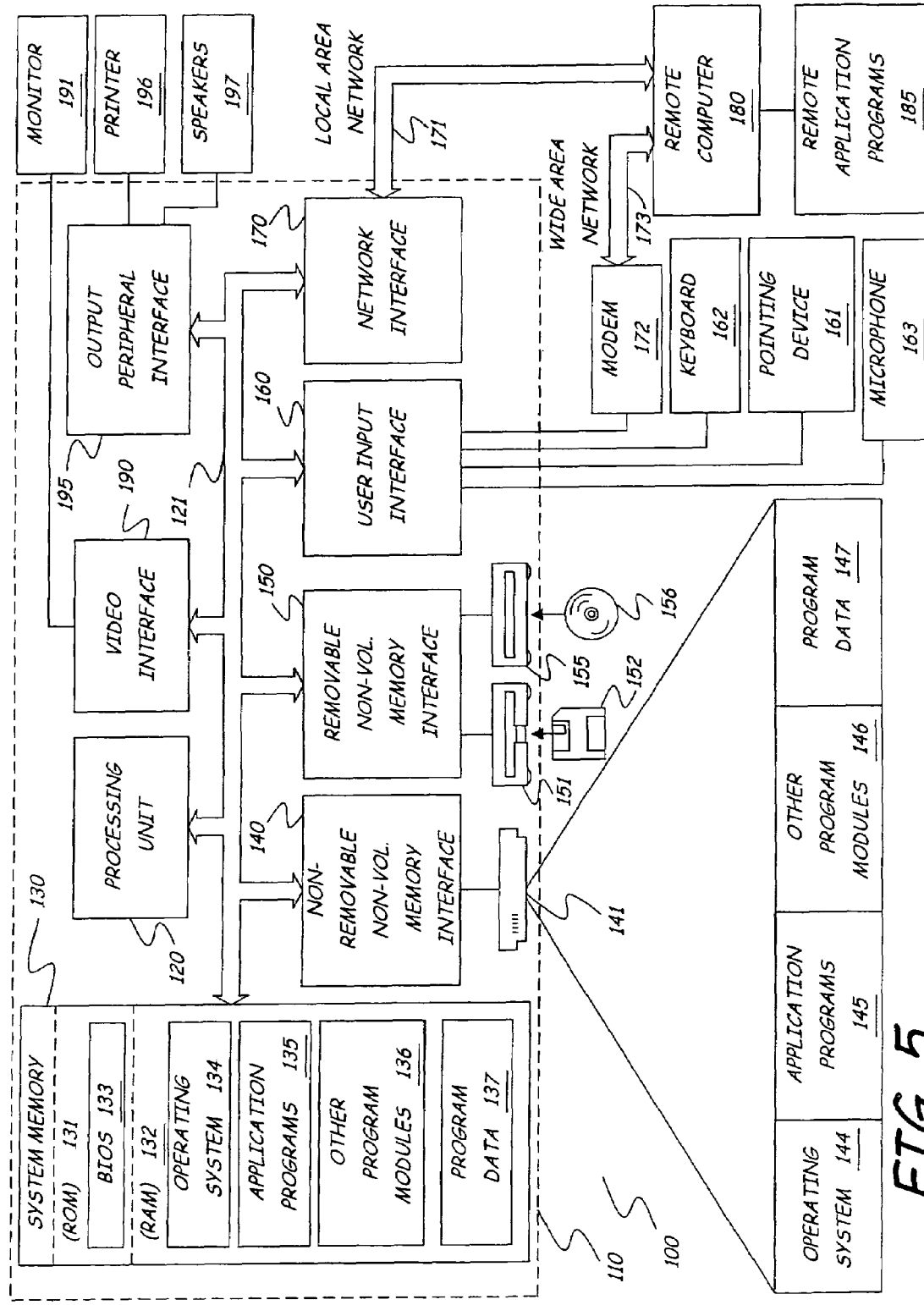
FIG. 5 is a block diagram of a general computing environment in which the present invention may be practiced.

FIG. 5 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 5, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 100.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 5 illustrates operating system 134, application programs 135, other program modules 136, and program data 137.

The computer 110 may also include other removable/non-removable volatile/nonvolatile computer storage media. By way of example only, FIG. 5 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 5, provide storage of computer readable instructions, data structures, program modules and other data for the computer 110. In FIG. 5, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 5 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 5 illustrates remote application programs 185 as residing on remote computer 180. It will be appreciated that the network connections shown are exemplary and other means of establishing a communications link between the computers may be used.

Figure 6:
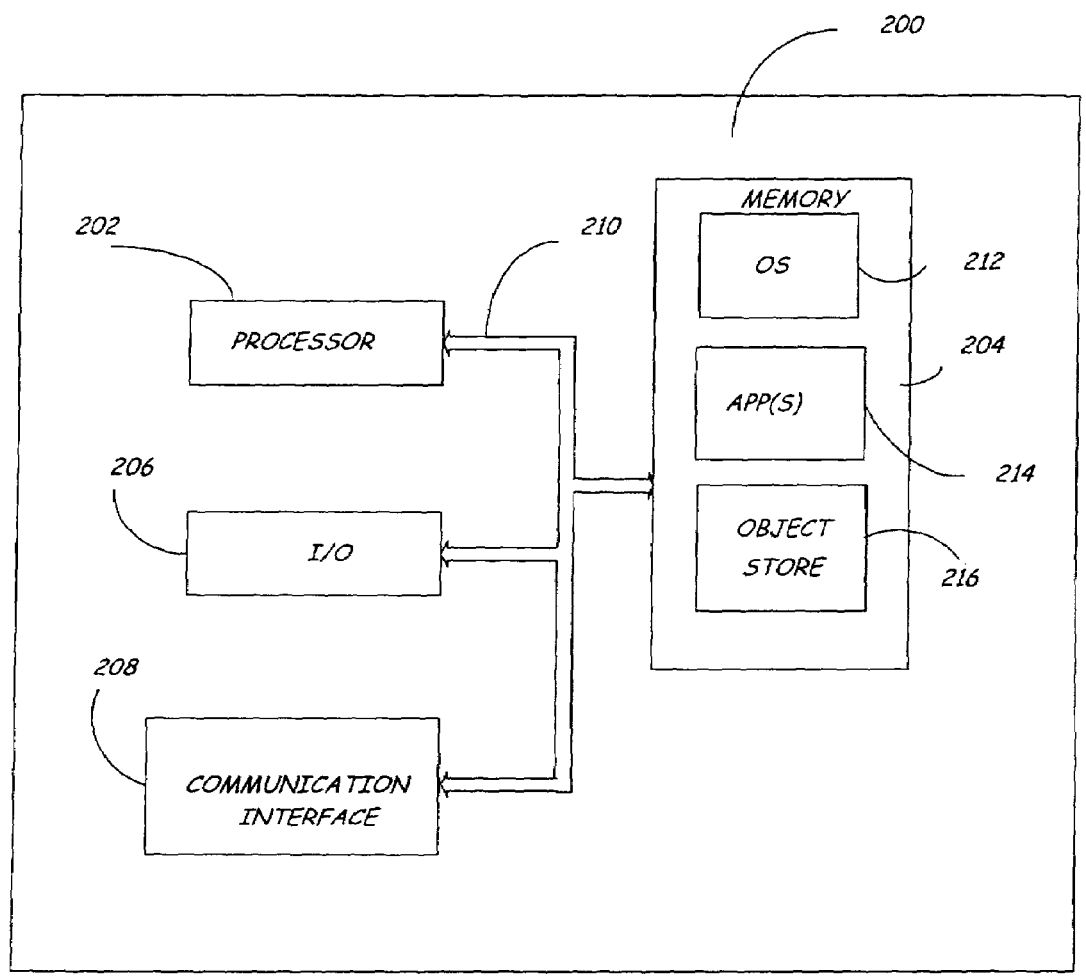
FIG. 6 is a block diagram of a mobile device in which the present invention may be practiced.

FIG. 6 is a block diagram of a mobile device 200, which is an exemplary computing environment. Mobile device 200 includes a microprocessor 202, memory 204, input/output (I/O) components 206, and a communication interface 208 for communicating with remote computers or other mobile devices. In one embodiment, the aforementioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200 within the scope of the present invention.

The present invention is based in part upon the realization that the accuracy of grammar checking can be improved by using a parser that assigns a stochastic measure to the parse trees it produces. Evaluation of alternative sentences or text strings is enhanced, thereby greatly improving the likelihood that any alternative sentences suggested to the user are correct. Generally, before suggesting an alternative to a sentence, the parser is run twice. The parser is first run to produce a parse for the original sentence, and then it is run a second time to produce a parse with a suggested correction. The stochastic measures of the two parses are compared and the one with the higher measure is picked as the correct sentence. In this way, suggested corrections can be double checked by the parser before being shown to the user. Further details of a grammar checking system and method employing these concepts are shown in FIGS. 7 and 8 and are described as follows.

Figure 7:
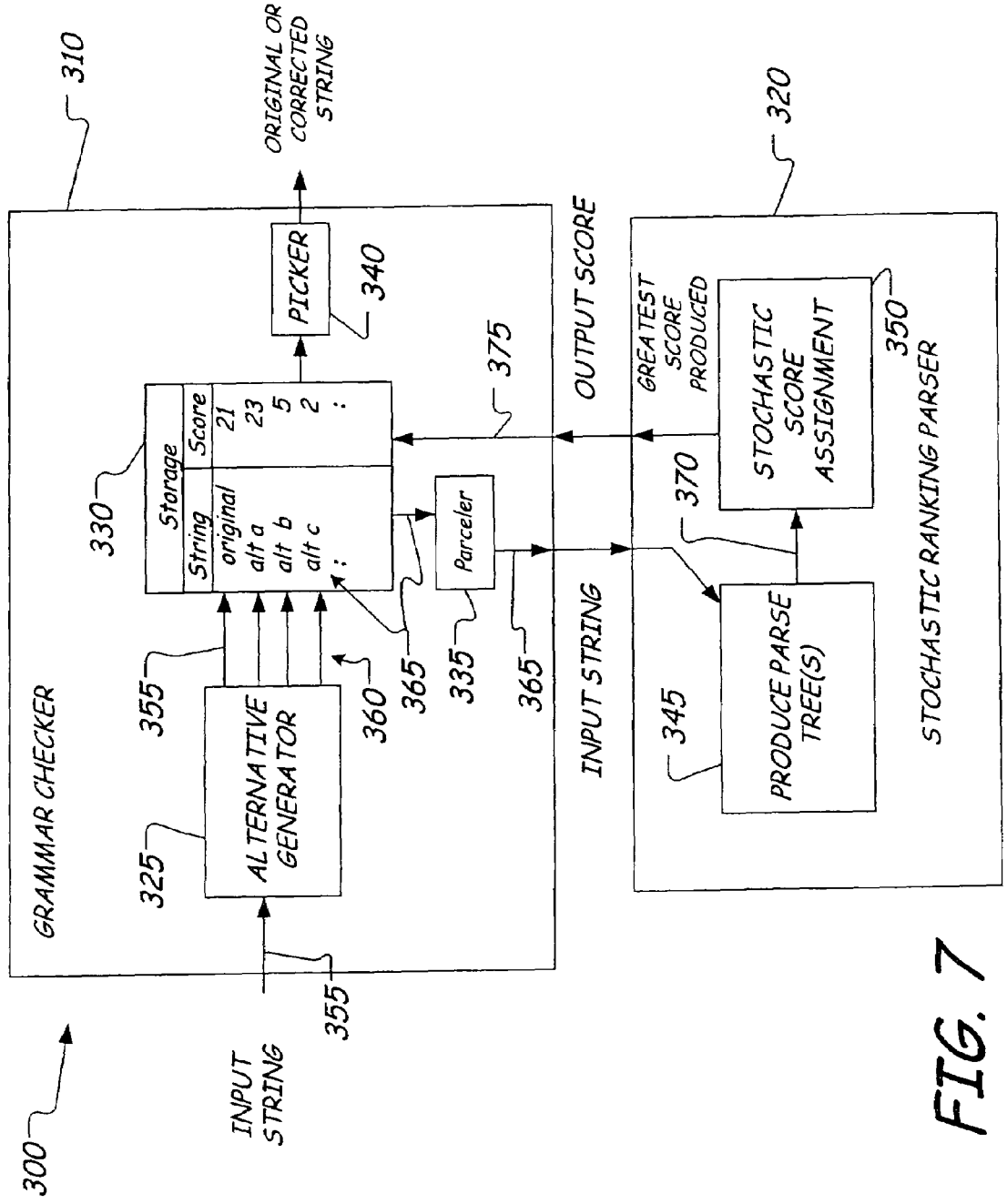
FIG. 7 is a block diagram of a grammar checking system in accordance with embodiments of the invention.
Figure 8:
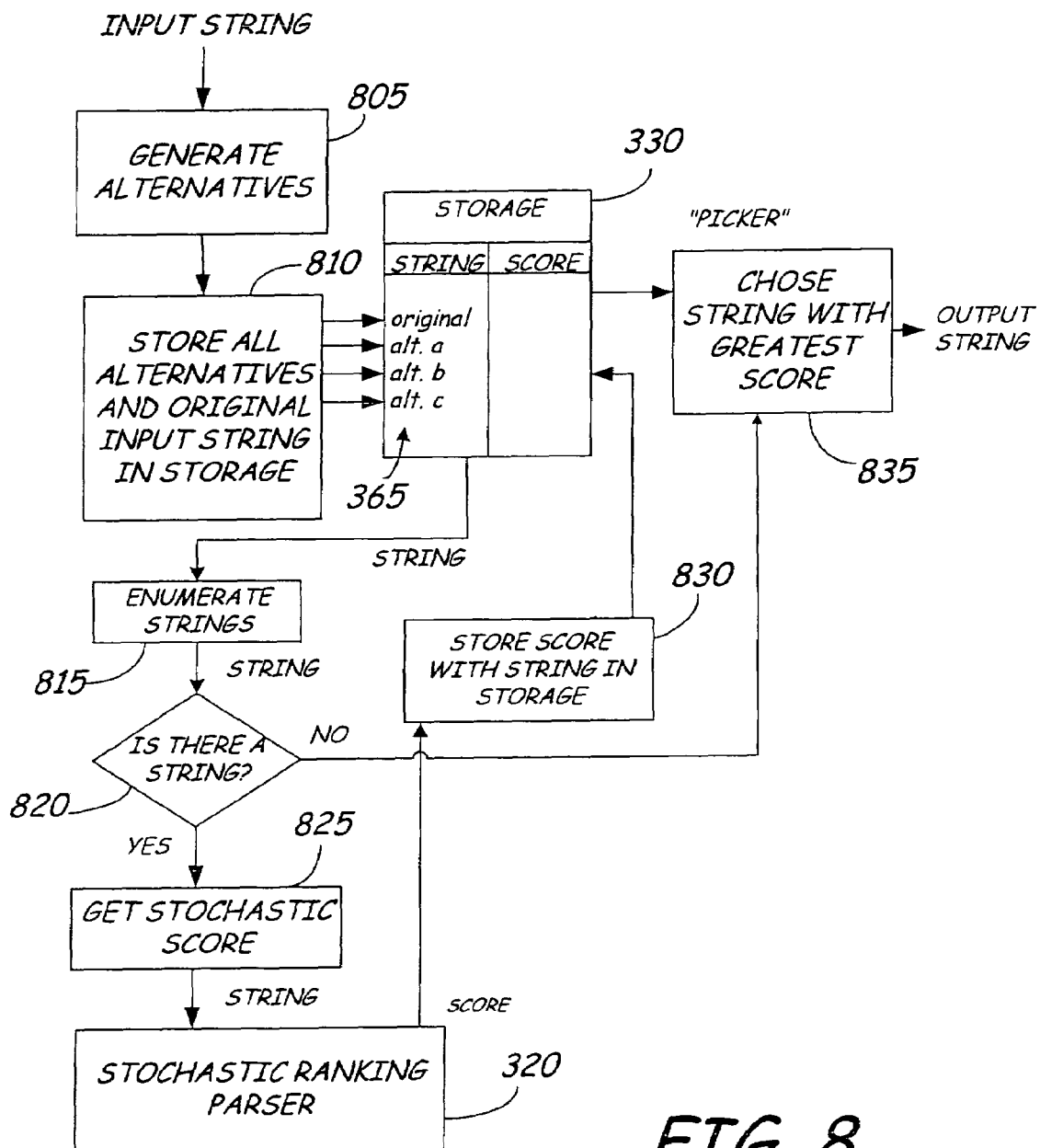
FIG. 8 is a diagrammatic illustration of a method of grammar checking in accordance with embodiments of the invention.

FIG. 7 illustrates a grammar checking system 300 which includes a grammar checker 310 and a stochastic ranking parser 320. Grammar checker 310 includes alternative generator 325, memory or storage 330, parceler 335 and picker 340. Stochastic ranking parser 320 includes a parse tree producer 345 and a stochastic score assignor 350. The components of system 300 can be implemented as program modules on computers such as computer 110, on mobile devices such as mobile device 200, or in other processing environments.

The input to system 300 is the original string 355 of text or a representation thereof. Alternative generator 325 receives the original input string and uses a set of grammar rules to look for what might be grammar mistakes in the string. If alternative generator 325 finds any potential mistakes, it generates one or more alternative versions 360 of the string (alternative versions "alt a", "alt b" and "alt c" are shown) and passes these alternative string versions, corresponding to possible grammatical corrections of the original string, to memory or storage 330. It also passes on the original string 355. The suggested correction alternatives 360, along with the original string, are collectively referred to herein as "Alternatives" 365.

Storage 330, which can correspond to designated memory within a computer, is used to keep track of Alternatives 365 (including corrected versions 360 and the original text string 355). Storage 330 also stores the stochastic score associated with each of Alternatives 365, although at this stage it has not yet been computed. This is discussed below with reference to stochastic ranking parser 320.

Given Alternatives 365 stored in storage 330, parceler 335 calls the stochastic parser 320 to calculate the stochastic score for each of the strings in Alternatives 365. In some embodiments, parcels the Alternatives 365 in storage 330 to the stochastic ranking parser 320 one at a time. Parse tree producer or producing functions 345 generate a parse tree 370 for each of the text strings in Alternatives 365. The parse tree 370 for each separate text string in Alternatives 365 is passed to stochastic score assignor 350, which uses any of a variety of stochastic parse score or goodness measure generating techniques to generate a separate stochastic score 375 for each string (corresponding to a parse tree 370) in Alternatives 365. After stochastic score assignment by parser 320 (discussed below in greater detail), grammar checker 310 then stores the stochastic score produced for each Alternative such that it is correlated with the Alternative in storage 330.

Picker 340 picks the Alternative from Alternatives 365 with the greatest stochastic score as the correct string. If the grammar checker 310 ends up with the original string as the most likely correct string based upon stochastic scores, then there is no grammar mistake to report to the user. If a different Alternative is picked, then the grammar checker alerts the user to this fact through some form of user interface. For example, the user can be notified of the fact that a different sentence or text string is being suggested through a graphical user interface (GUI) displayed on a monitor, liquid crystal display (LCD) or other display device.

Those skilled in the art will recognize that various other embodiments of the system 300 and corresponding algorithm are possible. For example, instead of storing all of the Alternatives 365 and then looping through the parser, one could have the alternative generator produce the Alternatives one at a time, call the parser to compute the stochastic score, and then store the results together at the same time. Another variation is to construct a lattice as input to the parser instead of calling the parser one string at a time. These and other embodiments are considered within the scope of the invention as set forth in the claims appended hereto.

FIG. 8 is a diagrammatic illustration of embodiments of the methods of the present invention which can be implemented using the grammar checking system 300 or other similar systems. As shown at block 805 in FIG. 8, alternative strings of text are generated in response to an input string of text which is to be grammar checked. The alternatives and the original string of text (collectively referred to as "Alternatives" 365) are stored in storage as is illustrated in block 810.

In block 815, the strings in Alternatives are enumerated and a determination as to whether there is a string to be analyzed is made at block 820. If a string exists which still needs to have a stochastic score or goodness measure assigned, then at block 825 a stochastic score is generated for the string by calling ranking parser 320 as described previously. As shown at block 830, the stochastic scores are stored along with the corresponding strings. Once there are no further strings to analyze, at block 835 the string having the highest stochastic score is determined and that string is selected for recommendation to the user.

The following description sets forth a specific embodiment of the ranking parser 320 used in an exemplary embodiment of the invention. This embodiment utilizes a particularly beneficial stochastic score or goodness measure generating method. However, the present invention can be used with any stochastic parser ranking method.

The exemplary parser 320 employs a goodness function to rank the possible grammatically correct parses of an utterance. The goodness function of the exemplary parser is highly accurate in representing the intended meaning of a speaker. It also has reasonable training data requirements. With this exemplary parser, the goodness measure of a particular parse is the probability of taking each transition ("transition probability") within the parse tree of that parse. Each transition probability within the tree is conditioned on highly predicative linguistic phenomena. Such phenomena include headwords, "phrase levels", and "syntactic history". Herein, the term "linguistic features" is used to generically describe transitions, headwords (including modifying headwords), phrase levels, and syntactic history.

Statistical Goodness Measure

The statistical goodness measure (SGM) of the exemplary parser uses a generative grammar approach. In a generative grammar approach, each sentence has a top-down derivation consisting of a sequence of rule applications (i.e., transitions). The probability of the parse tree is the product of the probabilities of all the nodes. The probability for a given node is the probability that from the node one would take a specific transition, given the syntactive features. The SGM of the exemplary parser may be calculated using either of the following equivalent formulas:

$$Prob(parse) = \\ \Pi_X Prob(trn(n_X), hw(n_Y), pl(n_Y), sh(n_Y), hw(n_Z), pl(n_Z), \\ sh(n_Z) | hw(n_X), pl(n_X), sh(n_X), segtype(n_X))$$ Formula A

OR ...

$$Prob(parse) = \\ \Pi_X Prob(trn(n_X)|hw(n_X), pl(n_X), sh(n_X), segtype(n_X)) \\ Prob(modhw(n_X)|trn(n_X), hw(n_X))$$ Formula B where $n_x$: is the $X^{th}$ node in a parse tree $n_y$ & $n_z$: are the $Y^{th}$ and $Z^{th}$ nodes and children of the $X^{th}$ node $trn(n_x)$: is the name of the transition out of $n_x$ of the form $X \rightarrow Y\ Z$ $hw(n_x)$: is the headword of $n_x$ $pl(n_x)$: is the phrase level of $n_x$ $sl(n_x)$: is the syntactic history of $n_x$ $segtype(n_x)$: is the segtype of $n_x$ $modhw(n_x)$: is the modifying headword of $n_x$ The exemplary parser defines phrase levels and labels them. Previous conventional approaches clustered transitions by segtype. For example, transitions focused on noun phrases, transitions focused verb phrases, etc. However, within each such grouping, the rules can be further subdivided into multiple levels. These levels are called "phrase levels" herein. These phrase levels are highly predicative of whether a transition will occur.

A null transition is utilized for each phrase level to account for no change from one level to the next. The null transition enables a node to move to the next level without being altered. The null transition is assigned probabilities just like other transitions.

The exemplary parser defines each node's syntactic history. Using the exemplary parser, phenomena that are predicative but appear elsewhere in the tree (other than simply a node's immediate decedents or ancestors) are included in the probability calculation.

The probabilities of the exemplary parser are conditioned on transition name, headword, phrase level, and syntactic history. Since the probabilities are conditioned on the transition name in the exemplary parser instead of just the structure of the rule (e.g. VP→NP VP), the parser may give the same structure different probabilities. In other words, there may be two transitions with the same structure that have different probabilities because their transition names are different. The probabilities of the SGM of the exemplary parser are computed top down. This allows for an efficient and elegant method for computing the goodness function.

A training corpus of approximately 30,000 sentences can be used to initially calculate the conditioned probabilities of factors such as transition name, headword, syntactic bigrams, phrase level, and syntactic history. The sentences in this training corpus have been annotated with ideal parse trees and the annotations contain all the linguistic phenomena on which the parser conditions.

The probabilities computation method has two phases: training and run-time. During the training phase, the system examines the training corpus, and pre-computes the probabilities (which may be represented as a "count") required at run-time. At run-time, the goodness function is quickly computed using these pre-computed probabilities (which may be "counts").

Conditioning on Headwords

Consider parse trees 590 and 592 shown in FIG. 9*a*. Assume the two parse trees are identical except for the transition that created the top-most VP (verb phrase). In Tree 590 of FIG. 9*a*, the verb phrase was created using the rule: VPwNPr1: VP→VP NP VPwNPr1 is used to add an object to a verb. For example, "John hit the ball" or "They elected the pope." In Tree 592 of FIG. 9*a*, the verb phrase was created using the rule: VPwAVPr: VP→VP AVP VPwAVPr is used when an adverbial phrase modifies a verb. For example, "He jumped high" or "I ran slowly."

To determine which tree was most probable using the conventional Transition Probability Approach (TPA), the number of occurrences of VPwNPr1 and VPwAVPr in the corpus is counted. If VPwNPr1 occurred most often, the conventional TPA's goodness function would rank Tree 590 of FIG. 9*a* highest.

This may be correct, but often it will be wrong since it will choose Tree 590 of FIG. 9*a* regardless of the linguistic context in which the rules appear. For example, assume that the headword was "smiled" Parse trees 594 and 596 shown in FIG. 9*b* illustrate the same parses shown in trees 590 and 592 in FIG. 9*a*, but the headword "smiled" is noted. English-speaking humans know that Tree 594 of FIG. 9*b* is highly unlikely. "Smiled" is intransitive and cannot take a direct object. In other words, "She smiled the ball" is incorrect because someone cannot "smile" a "ball." Although, it is correct to say, "She smiled the most" because the "most" is not an object of "smiled." Although "the most" can act as a noun phrase in other contexts, it is an adverb in this case.

If the headword is included into the probability calculations, the goodness function is more likely to pick the correct parse. In particular, instead of just counting up all occurrences of VPwNPr1 and VPwAVPr in the corpus, a count is made of how often these rules appear with the headword "smiled." In doing so, it likely to be discovered that there are no instances of VPwNPr1 occurring with the headword "smiled." Thus, the goodness function would calculate the probability of Tree 594 to be zero.

Phrase Level

Phrases (e.g., noun phrases or verb phrases) have a natural structure. The job of the grammar (i.e., grammar rules) is to build this structure. Because of the rules of the language and because of conventions used by the grammarian, there are constraints on how the phrasal structure can be built. This translates into constraints on the order in which the rules can be applied. In other words, some rules must run before other rules. The SGM of the exemplary parser implements phrase levels to make this set of constraints explicit. Since phrase levels are predicative of what transition can occur at each node in a parse tree, incorporating them into the goodness function makes the goodness function more accurate.

To define the phrase levels for a given segtype, rules that create the given segtype are grouped into levels. All the rules at a given level modify the segtype in the same way (e.g., add modifiers to the left). The levels are numbered from one to N. Each level contains a null transition that allows a node to move to the next level without having an effect on the phrase being built.

The analysis grammar build a phrase up by first producing an HWφ from a word. This is the head word of the phrase. It then enforces an order of levels by attaching modifiers of the headword in increasing phrase level order. For example, consider simple noun phrases in English. When building the parse tree for a noun phrase, the determiner (e.g., "the") is attached after the adjectives describing the noun. For example, "the red book" is correct, but "red the book" is not correct. Therefore, a rule that adds a determiner to a noun phrase must come after the rule(s) that add adjectives. Again, "after" is relevant to creation of a parse tree and the ordering of the application of the grammar rules. The term does not relate to the order of standard writing or reading.

For more complex noun phrases, the grammarian building a set of rules has some options. For example, consider the phrase: "The red toy with the loud siren." In one set of grammar rules, the structure may be like this:

(The (red (toy (with the loud siren))))

All prepositional phrases (e.g. "with the loud siren") are attached to noun first; adjectives are attached next, and finally the determiner ("the") is added last. Once a determiner is attached to a noun phrase, it is not possible to add additional adjectives or prepositional phrases. Another set of grammar rules might structure it this way:

((The (red toy)) (with the loud siren))

However, as long as a grammar clearly defines the structure of noun phrases, there exist constraints on the order of the rules. In the exemplary parser's SGM, this ordering is made explicit by adding phrase level information to the rules and conditioning our probabilities on these phrase levels.

As another example, consider the grammar shown in FIG. 10 that builds verb phrases. This grammar supports verbs, noun phrases, and adjective phrases, but it has been simplified and does not support a range of other valid linguistic phenomena like adverbs, infinitive clauses, prepositional phrases, and conjunctions. This grammar can parse simple verb phrases like those shown in the description column of FIG. 10 and complex phrases like:

"More surprising, we have all found useful the guidelines which were published last year"

Figure 11A:
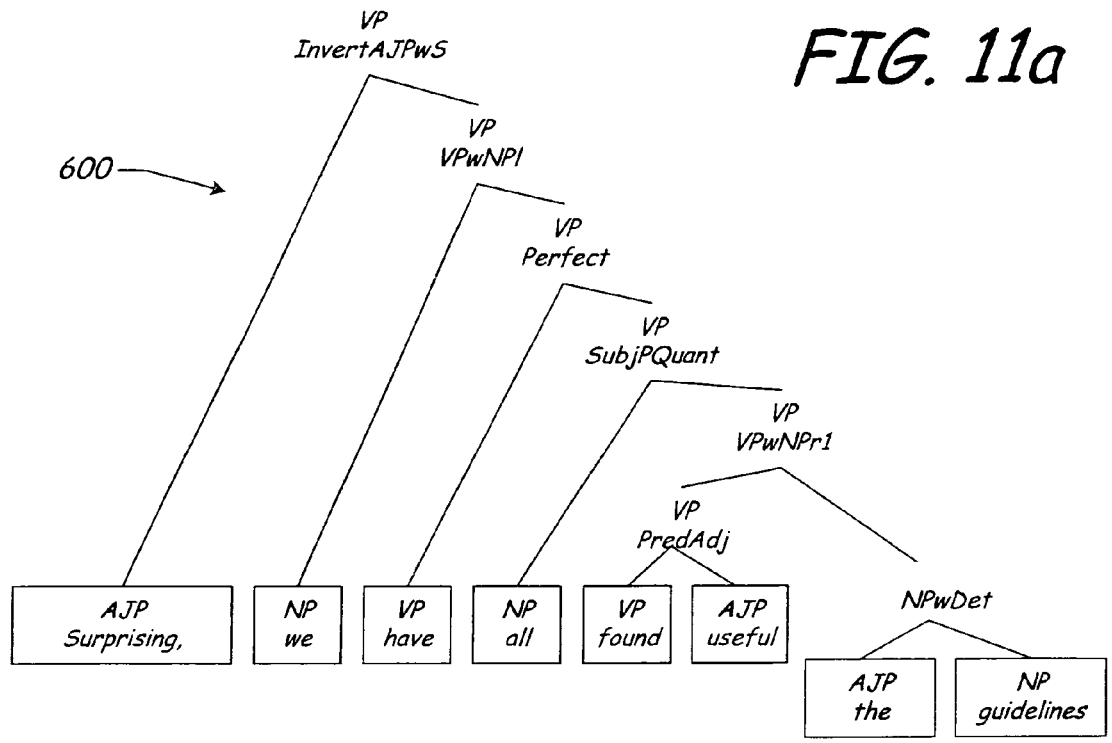
FIGS. 11a and 11b show fragments of two pairs of typical parse trees.

FIG. 11*a* shows a parse tree 600 representing a parse of the above sentence, where the parse is done in accordance with the example grammar provided above. To build complex verb phrases, this grammar enforces an ordering on the rules. First, VerbtoVP always runs to create the initial verb phrase. Then, post modifiers are added using PredAdj and/or VPwNPr1. Then "have" and quantifiers can be added. Next, the subject is added using SubjAJP or VPwNPl. Finally, topicalization and inverted AJP can be applied to phrases that have a subject. Constraints, such as those shown in the table of FIG. 12, are made explicit by adding the phrase level (of the exemplary parser) into the grammar rules.

As shown in the table of FIG. 12, on the right-hand side of each rule, each constituent is associated with a particular phrase level that is required for that constituent. Specifically, the number in parenthesis indicates the phrase level of the constituent (e.g., "VP(4)").

On the left-hand side of the rule, the phrase level of the resulting node is specified. For example, consider the null transition:

VP(4)→VP(3)

This null transition can be applied to a VP at phrase level three and create a VP at phrase level four.

"PL_Max" in a phrase level indicator means the highest phrase level that occurs for a given segtype. For example, for the grammar above VP(PL_Max) would be the same as VP(5). As another example:

VPwNPl: VP(4)→NP(PL_Max) VP(3)

This means that the rule can be applied to an NP that is at the highest NP level and to a VP that is at level three. The result of running the rule is to create a VP at level four.

Sometimes the phrase level of a constituent of the same segtype is the resulting node and may be either at the phrase level of the resulting node of less than then phrase level of the resulting node. For example:

Perfect: VP (3)→VP(1) VP(2,3)

He melted.

He had melted.

He had been melted.

To see an example of null transitions, consider the phrase:

"Surprising, we found useful the guidelines."

Notice that this phrase differs from the similar phrase used above in that " . . . we have all found useful . . . " has been simplified to be " . . . we found useful . . . "

The rule VpwNul at transition null requires the seond constituent to have PL3. Because the constituent has PL2 we construct a null transition first.

Figure 11B:
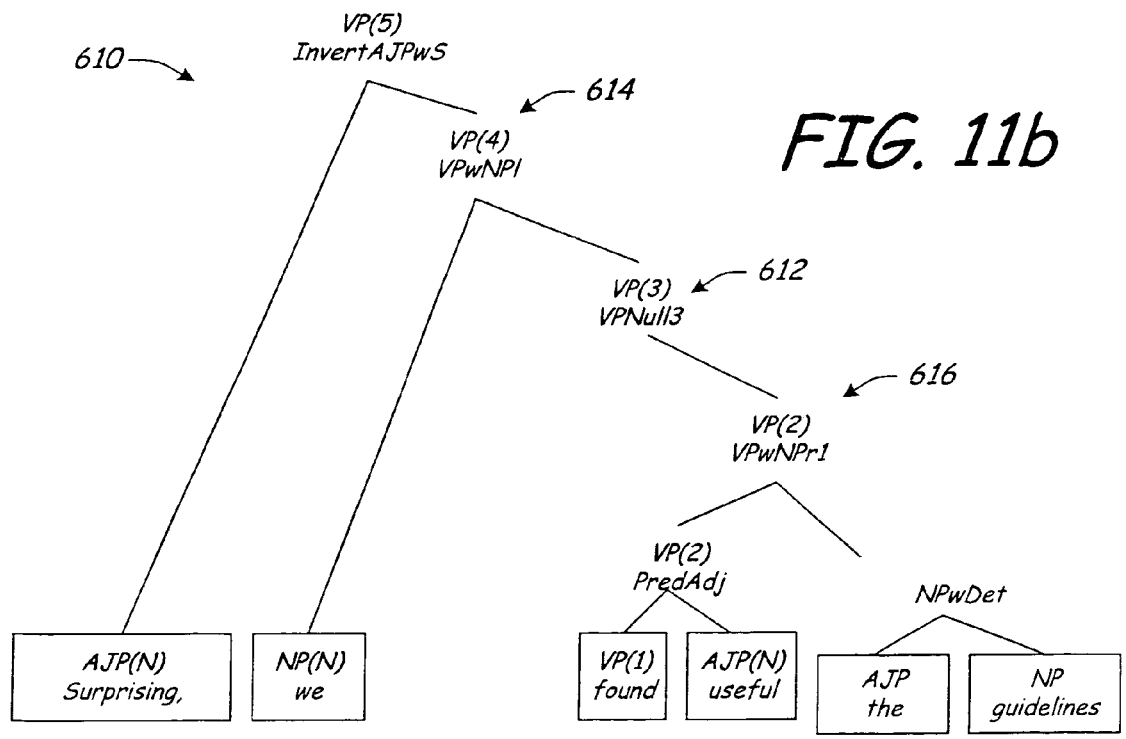

FIG. 11b shows a parse tree 610 representing a parse of this sentence. The null transition at 612 is used to move the VP(2) to be a VP(3). The null transition can be explicitly represented in the parse tree (as shown in FIG. 11b) or be implicit. It doesn't matter as long as it is taken into account in the computation of the probabilities of the exemplary parser. Conditioning on phrases levels means that any parse tree that violates the phrase level constraints can be eliminated (given probability equal to zero) by the exemplary parser.

The phrase levels and null transitions of the exemplary parser models the grammar of the English natural language. For example, consider the noun "nut." You would never see a sentence such as 'I want nut.' or 'Nut is on the table.' The word "nut" wants a determiner such as "a" or "the". The phrase levels and null transitions force the exemplary parser to explicitly consider the absence of modifiers, as well as their presence.

Syntactic History

A node's syntactic history is the relevant grammatical environment that a node finds itself in. It may include the history of transitions that occur above the node. For example, is the node below a NREL, PRPRT, PTPRT, RELCL, or AVPVP? It may include whether the node is in a passive or an active construction. It may include information that appears elsewhere in the tree. For example, whether the headword of a sibling node is singular or plural. The specifics of what it relevant is dependent upon the specifics of the grammar (i.e., rewrite rules or transitions) being used.

Figure 13:
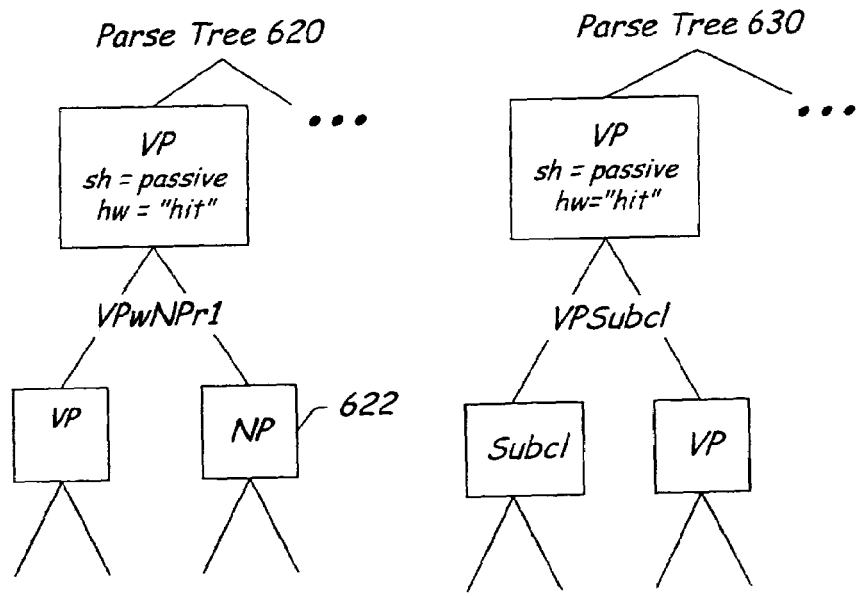
FIG. 13 shows fragments of a pair of typical parse trees and illustrates the use of syntactic history.

For example, FIG. 13 shows two parse trees, 620 and 630, for the same verb phrase. Both trees are parsing a verb phrase having the mono-transitive headword (hw="hit") and the verb phrase is known to be passive (sh=passive). In tree 620, the verb has a direct object as represented by NP at 622. In tree 630, the verb does not take a direct object.

In English, a mono-transitive verb inside a passive construction does not take a direct object. In contrast, when in the active form, the mono-transitive verb "hit" takes a direct object. For example, "I hit theball" in the active form has a direct object "ball" to the verb "hit", but "the ball was hit" in the passive form has no direct object to "hit." English-speaking humans know that tree 620 will never occur. In other words, there is a zero probability of a mono-transitive verb (like "hit") taking a direct object when the sentence is passive.

In the exemplary parser, the transition probabilities are conditioned on syntactic history as well as headwords. Using a training corpus, the exemplary parser counts up how often VPwNPr1 occurs in a passive construction with a mono-transitive verb and finds that it never occurs. Thus, the probability of Tree 620 would be calculated to be zero.

Figure 14:
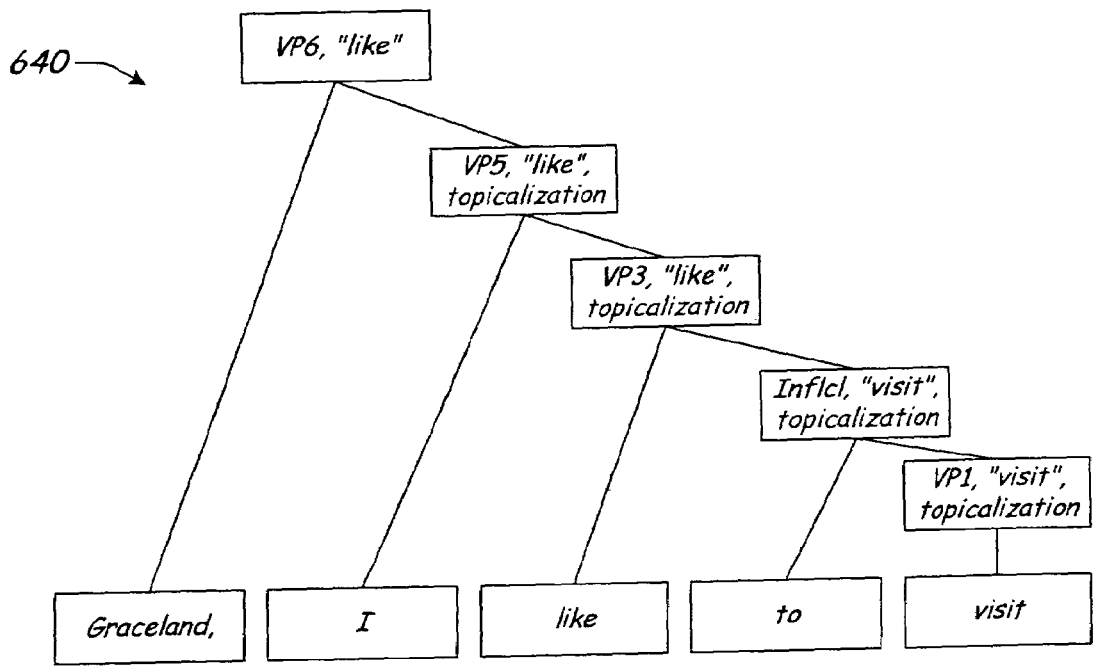
FIG. 14 shows a typical parse tree of a sample sentence, "Graceland, I like to visit," which illustrates the "topicalization" syntactic phenomenon.

Syntactic history can be propagated down many levels of the tree. Take, for example, the sample sentence, "Graceland, I love to visit." The thing ("Graceland") that "I" love to visit is stated before it is revealed the "I" loves to visit anything. FIG. 14 shows an annotated parse tree 640 of a parse of this sample sentence. As can be seen in FIG. 14, the "topicalization" feature is propagated past the verb "like" to the verb "visit." A complete discussion of syntactic phenomena which can be incorporated into syntactic history is not provided here, but the concepts of syntactic phenomena are well known by linguists.

SGM of the Exemplary Parser

The SGM (statistical goodness measure) of the exemplary parser uses a generative grammar approach—each sentence has a top-down derivation consisting of a sequence of rule applications (transitions). The probability of a parse tree is the product of the probabilities of all the nodes within that tree.

Generally, the probability of a node is defined as a conditional probability:

$$\text{Prob}(node) = \text{Prob}(what\_is\_unknown | what\_is\_known) \quad \text{Formula 1}$$

Figure 15:
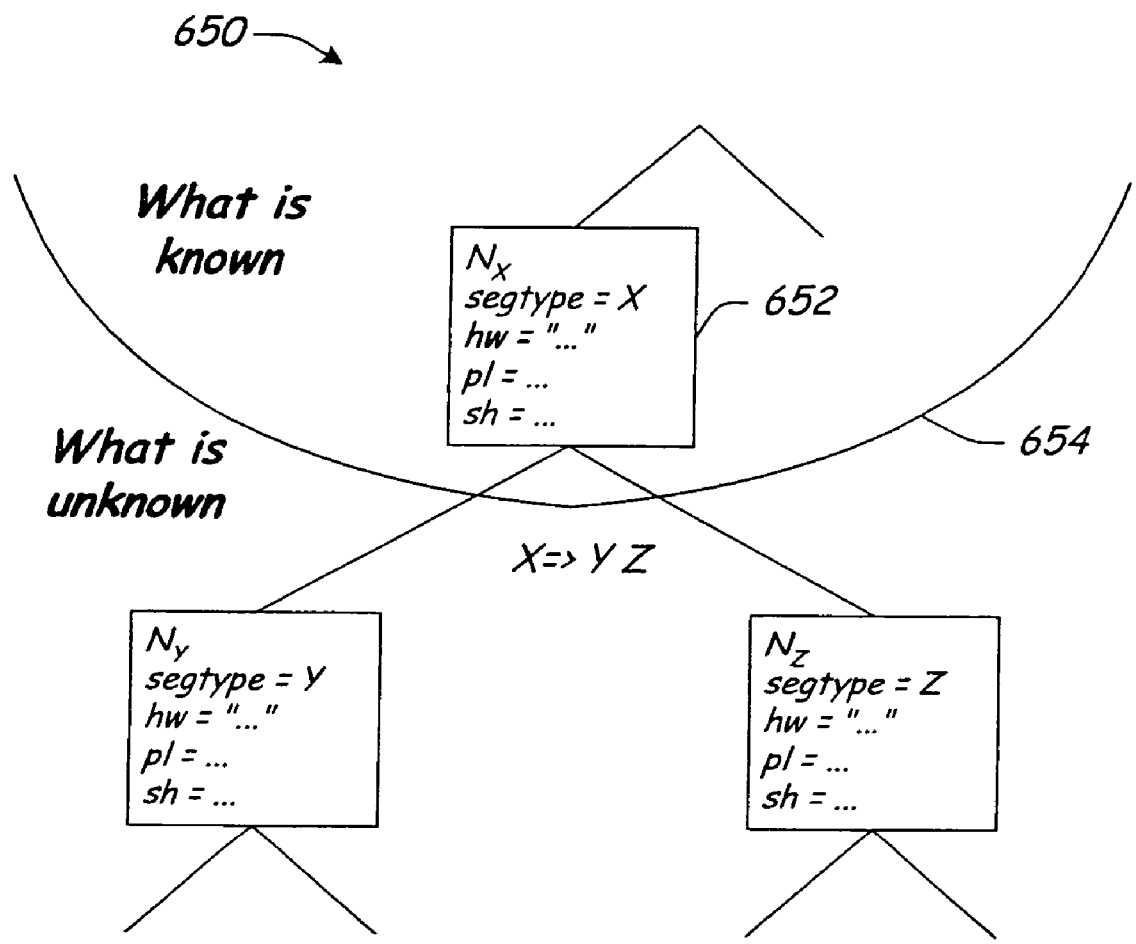
FIG. 15 shows a fragment of a genericized parse tree, illustrating what is known and not known at a node.

Assume that each node is visited in a depth-first tree walk. What is known is the information associated with the node and/or with any node previously encountered in the tree walk. For example, the properties of the node, it is headword, phrase level, syntactic history, and segtype. What is unknown is what occurs below the node (i.e., the transition taken and the properties of its children). FIG. 15 shows a portion of a parse tree 650 and visually illustrates what is known and unknown at a node 652. What is known is above line 654 because it has already been processed. Below line 654 is what is unknown because it has not been processed.

With reference to the parse tree 650 of FIG. 15, the conditional probability of exemplary parser is:

$$\text{Prob}(parse) = \Pi_X \text{Prob}(n_X) \quad \text{Formula 2}$$
$$= \Pi_X \text{Prob}(trn(n_X), hw(n_Y), pl(n_Y),$$
$$sh(n_Y), hw(n_Z), pl(n_Z), sh(n_Z) | hw(n_X),$$
$$pl(n_X), sh(n_X), segtype(n_X)))$$

where $n_X$ ranges over all nodes in the tree and the transition named by $trn(n_X)$ is of the form $X \rightarrow Y\ Z$ or of the form $X \rightarrow Y$.

To simplify Formula 2, it is noted that not all the parameters are independent. In particular, $trn(n_X)$ and $pl(n_X)$ imply $pl(n_Y)$ and $pl(n_Z)$. In other words, the name of the transition and the phrase level at node X implies the phrase levels of nodes Y and Z. Therefore, $pl(n_Y)$ and $pl(n_Z)$ may be removed from the left-hand side of the formula:

$$= \Pi_X \text{Prob}(trn(n_X), hw(n_Y), sh(n_Y), hw(n_Z), \quad \text{Formula 3}$$
$$sh(n_Z) | hw(n_X), pl(n_X), sh(n_X), segtype(n_X)))$$

Similarly, Formula 3 may be simplified because $trn(n_X)$, $hw(n_X)$ and $sh(n_X)$ imply $sh(n_Y)$ and $sh(n_z)$. In other words, the name of the transition, the headword, and the syntactic history at node X implies the syntactic history of nodes Y and Z. Therefore, $sh(n_Y)$ and $sh(n_Z)$ may be removed from the from the left-hand side of the formula:

$$= \Pi_X \text{Prob}(trn(n_X), hw(n_Y), \quad \text{Formula 4}$$
$$hw(n_Z) | hw(n_X), pl(n_X), sh(n_X), segtype(n_X)))$$

Formula 4 may be further simplified. Tracking both $hw(n_Y)$ and $hw(n_Z)$ is not particularly valuable because one of them is the same as $hw(n_X)$. The one that is not the same is the modifying headword. The notation $modhw(n_X)$ to refer to this modifying headword. This yields:

$$= \Pi_X \text{Prob}(trn(n_X), modhw(n_X), | hw(n_X), \quad \text{Formula 5}$$
$$pl(n_X), sh(n_X), segtype(n_X)))$$

Formula 5 may be simplified still further by applying the chain rule (as understood by those skilled in the art of statistics), yields this:

$$= \Pi_X Prob(trn(n_X)|hw(n_X), pl(n_X), sh(n_X), segtype(n_X)) * \quad \text{Formula 6}$$
$$Prob(modhw(n_X)|trn(n_X),$$
$$hw(n_X), pl(n_X), sh(n_X), segtype(n_X))$$

Since $trn(n_X)$ implies $pl(n_X)$ and $segtype(n_X)$, the Formula 6 can further simplify this to be:

$$= \Pi_X Prob(trn(n_X)|hw(n_X), pl(n_X), sh(n_X), segtype(n_X)) * \quad \text{Formula 7}$$
$$Prob(modhw(n_X)|trn(n_X), hw(n_X), sh(n_X))$$

Finally, since it has been found that $sh(n_X)$ is not very predicative of what the modifying headword will be, Formula 7 can be approximated by removing $sh(n_X)$ from that part of Formula 7:

$$\cong \Pi_X Prob(trn(n_X)|hw(n_X), pl(n_X), sh(n_X), segtype(n_X)) \quad \text{Formula 8}$$
$$Prob(modhw(n_X)|trn(n_X), hw(n_X))$$

(SMG for a *parse*)

Notice that Formula 8 above is Formula B recited near the beginning of this detailed description.

PredParamRule Probability and SynBigram Probability

As described above, the probability of a parse tree is the products of the probabilities of each node. The probability of each node is the product of two probabilities. Thus, the SGM probability formula for a single node in a tree may be rewritten like this:

$$Prob(trn(n_X)|hw(n_X), pl(n_X), sh(n_X), segtype(n_X))$$
$$Prob(modhw(n_X)|trn(n_X), hw(n_X)) \quad \text{Formula 9}$$

(SGM Probability at a Given Node X)

where X ranges over all the nodes in the parse tree.

This represents the statistical goodness measure (SGM) of the exemplary parser. This may be divided into to two parts. For convenience, the first probability will be called the predictive-parameter-and-rule probability or simply "PredParamRule Probability" and the second probability will be called the "SynBigram Probability".

The PredParamRule Probability is:

$$Prob(trn(n_X)|hw(n_X), pl(n_X), sh(n_X), segtype(n_X)) \quad \text{Formula 10}$$

(PredParamRule Probability)

Unlike the Simple Content Dependent Approach (described above in the background section), the PredParamRule Probability of the exemplary parser conditions upon headword, segtype, phrase level, and syntactic history. Since these are highly predicative of the contextually correct parse, this PredParamRule Probability is a significantly more accurate goodness function than conventional techniques.

The SynBigram Probability is:

$$Prob(modhw(n_X)|trn(n_X), hw(n_X)) \quad \text{Formula 11}$$

(SynBigram Probability)

The SynBigram Probability computes the probability of a syntactic bigram. Syntactic bigrams are two-word collocation. The probability a measure of the "strength" of the likelihood of a pair of words appearing together in a syntactic relationship. For example, the object of the verb "drink" is more likely to be "coffee" or "water" than "house".

As described above in the background section, this is a conventional technique to calculate a goodness measure. However, with existing conventional syntactic bigram approaches, it is used alone to calculate the goodness function and it requires a huge training corpus. The exemplary parser overcomes the limitations of conventional syntactic bigram approaches by further conditioning the goodness measure on independent probability characteristics. In particular, those characteristics are represented by the PredParamRule Probability formula (Formula 10).

As a review, the following is a known about calculating conditional probabilities by counting appearances in a training corpus:

$$Prob(x|y) = \frac{Prob(x \& y)}{Prob(y)}$$
$$= \frac{Count(x \& y)}{Count(y)}$$

Therefore, the PredParamRule Probability and the SynBigram Probability can be calculated by counting the appearances of relevant events in the training corpus. The probabilities of a given training corpus that are determined by the PredParamRule Probability and the SynBigram Probability may be generally called "language-usage probabilities" for that given training corpus.

Thus, the PredParamRule Probability formula (Formula 10) may be calculated as follows:

PredParamRule Probability $$\text{PredParamRule Probability} \quad \text{Formula 12}$$
$$= Prob(trn(n_X)|hw(n_X), pl(n_X),$$
$$sh(n_X), segtype(n_X))$$
$$= \frac{Count(trn(n_X) \& hw(n_X) \& pl(n_X) \& sh(n_X) \& segtype(n_X))}{Count(hw(n_X) \& pl(n_X) \& sh(n_X) \& segtype(n_X))}$$

Moreover, the SynBigram Probability formula (Formula 11) may be calculated as follows:

$$\text{SynBigram Probability} = Prob(modhw(n_x)|trn(n_x)hw(n_x)) \quad \text{Formula 13}$$
$$= \frac{Count(modhw(n_x) \& trn(n_x) \& hw(n_x))}{Count(trn(n_x) \& hw(n_x))}$$

Two Phases of SGM Calculation

Typically, a parser of an NLP system (such as the exemplary parser) is designed to quickly calculate the goodness measure for many parse trees of parses of a phrase. To accomplish this, the exemplary parser is implemented in two phases: "training" and "run-time."

During the training phase, the exemplary parser pre-calculates the counts that are needed to compute the PredParamRule Probability and the SynBigram Probability at run-time. Although this process tends to be time-consuming, processor-intensive, and resource-intensive, it only need be once for a given training corpus.

The result of the training phase is a set of counts for headword, phrase level, syntactic history, and segtype. If the training corpus approximates the natural language usage of a given purpose (general, specific, or customized), then the counts also approximate the natural language usage for the same purpose.

At run-time, these pre-calculated counts are used to quickly determine the probability of the parse tree. Each phrase is parsed into multiple parse trees. Each parse tree is given a SGM based upon the pre-calculated counts.

Alternatively, the training and run-time phase may be performed nearly concurrently. The training phase may be performed on a training corpus (or some subset of such corpus) just before the run-time phase is performed. Those who are skilled in the art will understand that time and space trade-offs may be made to accommodate the given situation. Regardless, the training phase (or some portion thereof) is performed, at least momentarily, before the run-time phase. This is because the training phase provides the foundation for the run-time phase to base its SGM calculations.

Although the present invention has been described with reference to particular embodiments, workers skilled in the art will recognize that changes may be made in form and detail without departing from the spirit and scope of the invention. For example, references to a string of text being stored or acted upon should be understood to include various representations, such as parse trees, of the string of text.

What is claimed is:

1. A method of grammar checking an input string of text, the method comprising:
   generating alternative strings of text;
   producing parse trees for the input string of text and for each of the alternative strings of text;
   calculating separate parse scores for each of the parse trees generated for the input string of text and for each of the alternative strings of text, wherein calculating separate parse scores further comprises generating a statistical goodness measure for each of the parse trees by combining probabilities of each node in a particular parse tree, wherein the probabilities of each node are determined by the steps comprising:
      receiving language-usage probabilities based upon appearances of instances of combinations of linguistic features within a training corpus, wherein the language-usage probabilities include predictive-parameter-and-rule probabilities and syntactic bigram probabilities; and
      calculating the probabilities of each node based upon linguistic features of each node and the language-usage probabilities;
   determining which one string of text, out of the input string of text and the alternative strings of text, has the highest stochastic parse score; and
   selecting the one string of text which has the highest stochastic parse score.

2. The method of claim 1, wherein generating alternative strings of text further comprises generating the alternative strings of text such that each of the alternative strings of text corresponds to a different possible grammatical correction of the input string of text.

3. The method of claim 2, and further comprising recommending to a user the selected one string of text which has the highest stochastic parse score.

4. The method of claim 3, wherein if the selected one string of text is the input string of text, then recommending to the user the selected one string of text further comprises not recommending a grammar correction for the input string of text.

5. The method of claim 1, wherein the statistical goodness measure for each of the parse trees is an indicator of a likelihood that the particular parse tree represents the intended meaning of a human originating the text corresponding to the input string of text.

6. A computer-readable medium having computer-executable instructions for performing the grammar checking steps comprising:
   receiving an input string of text;
   generating alternative strings of text;
   producing parse trees for the input string of text and for each of the alternative strings of text;
   calculating separate parse scores for each of the parse trees generated for the input string of text and for each of the alternative strings of text by generating a separate statistical goodness measure for each of the strings of text using the corresponding parse tree, wherein a goodness measure of a parse for a particular parse tree is a probability of taking each transition within the particular parse tree;
   determining which one string of text, out of the input string of text and the alternative strings of text, has the highest stochastic parse score; and
   selecting the one string of text which has the highest stochastic parse score.

7. The computer readable medium of claim 6, wherein generating alternative strings of text further comprises generating the alternative strings of text such that each of the alternative strings of text corresponds to a different possible grammatical correction of the input string of text.

8. The computer readable medium of claim 7, and further having computer-executable instructions for performing the grammar checking step of recommending to a user the selected one string of text which has the highest stochastic parse score.

9. The computer readable medium of claim 8, wherein if the selected one string of text is the input string of text, then recommending to the user the selected one string of text further comprises not recommending a grammar correction for the input string of text.

10. The computer readable medium of claim 6, wherein the statistical goodness measure for each of the parse trees is an indicator of a likelihood that the particular parse tree represents the intended meaning of a human originating the text corresponding to the input string of text.

11. The computer readable medium of claim 10, wherein calculating the separate parse scores for each of the parse trees further comprises calculating the parse scores as functions of probabilities determined using a training corpus.

12. The computer readable medium of claim 11, wherein calculating separate parse scores further comprises generating a statistical goodness measure for each of the parse trees by combining probabilities of each node in a particular parse tree, wherein the probabilities of each node are determined by the steps comprising:

receiving language-usage probabilities based upon appearances of instances of combinations of linguistic features within the training corpus, wherein the language-usage probabilities include predictive-parameter-and-rule probabilities and syntactic bigram probabilities; and calculating the probabilities of each node based upon linguistic features of each node and the language-usage probabilities.

13. A grammar checking system comprising:

an alternative generator configured to receive an input string of text, and in response, to generate alternative strings of text corresponding to different possible grammatical corrections of the input string of text;

a parse tree producer configured to generate parse trees for the input string of text and for each of the alternative strings of text;

a stochastic score generator configured to receive the parse trees for the input string of text and for each of the alternative strings of text and to generate separate parse scores for each of the strings of text from the corresponding parse tree by generating a separate statistical goodness measure for each of the strings of text using the corresponding parse tree, wherein a goodness measure of a parse for a particular parse tree is a probability of taking each transition within the particular parse tree; and a string selector configured to determine which string of text, out of the input string of text and the alternative strings of text has a greatest parse score and to select the string of text having the highest parse score.

14. The grammar checking system of claim 13, wherein the statistical goodness measure for each of the parse trees is an indicator of a likelihood that the particular parse tree represents the intended meaning of a human originating the text corresponding to the input string of text.

15. The grammar checking system of claim 14, wherein the stochastic score generator is configured to generate the separate statistical goodness measure for each of the strings of text as functions of probabilities determined using a training corpus.

16. The grammar checking system of claim 15, wherein the stochastic score generator is configured to generate the separate statistical goodness measure for each of the strings of text by combining probabilities of each node in the corresponding parse tree, wherein the probabilities of each node are determined by the steps comprising:

receiving language-usage probabilities based upon appearances of instances of combinations of linguistic features within the training corpus; and calculating the probabilities of each node based upon linguistic features of each node and the language-usage probabilities.

* * * * *